United States Patent [19]
Johnson

[11] 4,009,976
[45] Mar. 1, 1977

[54] APPARATUS FOR PRODUCING A FOAMED POLYSTYRENE SHEET HAVING A DENSITY GRADIENT DECREASING FROM THE EXTERNAL SURFACES INWARDLY

[75] Inventor: David Emil Johnson, Macedon, N.Y.

[73] Assignee: Mobil Oil Corporation, New York, N.Y.

[22] Filed: Nov. 21, 1974

[21] Appl. No.: 526,015

Related U.S. Application Data

[62] Division of Ser. No. 394,039, Sept. 4, 1973, Pat. No. 3,864,444.

[52] U.S. Cl. ................................. 425/68; 425/71; 425/325; 425/404; 425/817 C
[51] Int. Cl.² ..................................... B29D 23/04
[58] Field of Search ............... 264/48, 52, 53, 209, 264/51, 234; 425/4 C, 817 C, 67, 68, 69, 70, 71, 72, 404, 325, 326 R, 387 R

[56] References Cited
UNITED STATES PATENTS

| | | | |
|---|---|---|---|
| 2,043,455 | 6/1936 | Voss et al. | 425/68 X |
| 2,176,925 | 10/1939 | Reichel et al. | 425/68 X |
| 3,121,760 | 2/1964 | Kline | 264/51 |
| 3,221,084 | 11/1965 | Peticolas | 425/72 X |
| 3,364,524 | 1/1968 | Hsia | 425/387 X |
| 3,702,224 | 11/1972 | North et al. | 425/71 |
| 3,749,540 | 7/1973 | Upmeier | 425/72 X |

Primary Examiner—Francis S. Husar
Assistant Examiner—Mark Rosenbaum
Attorney, Agent, or Firm—Charles A. Huggett; Michael G. Gilman; Charles A. Malone

[57] ABSTRACT

Polystyrene foam is extruded upwardly as a tube into a cooling media of boiling water, both the interior and exterior surfaces of the cylindrically shaped extrudate passing through a bath of boiling water of variable depth. The polystyrene foam extrudate produced by such a method has a high density at the interior and exterior surfaces, with the density progressively decreasing from these surfaces toward the center core of the extrudate.

2 Claims, 3 Drawing Figures

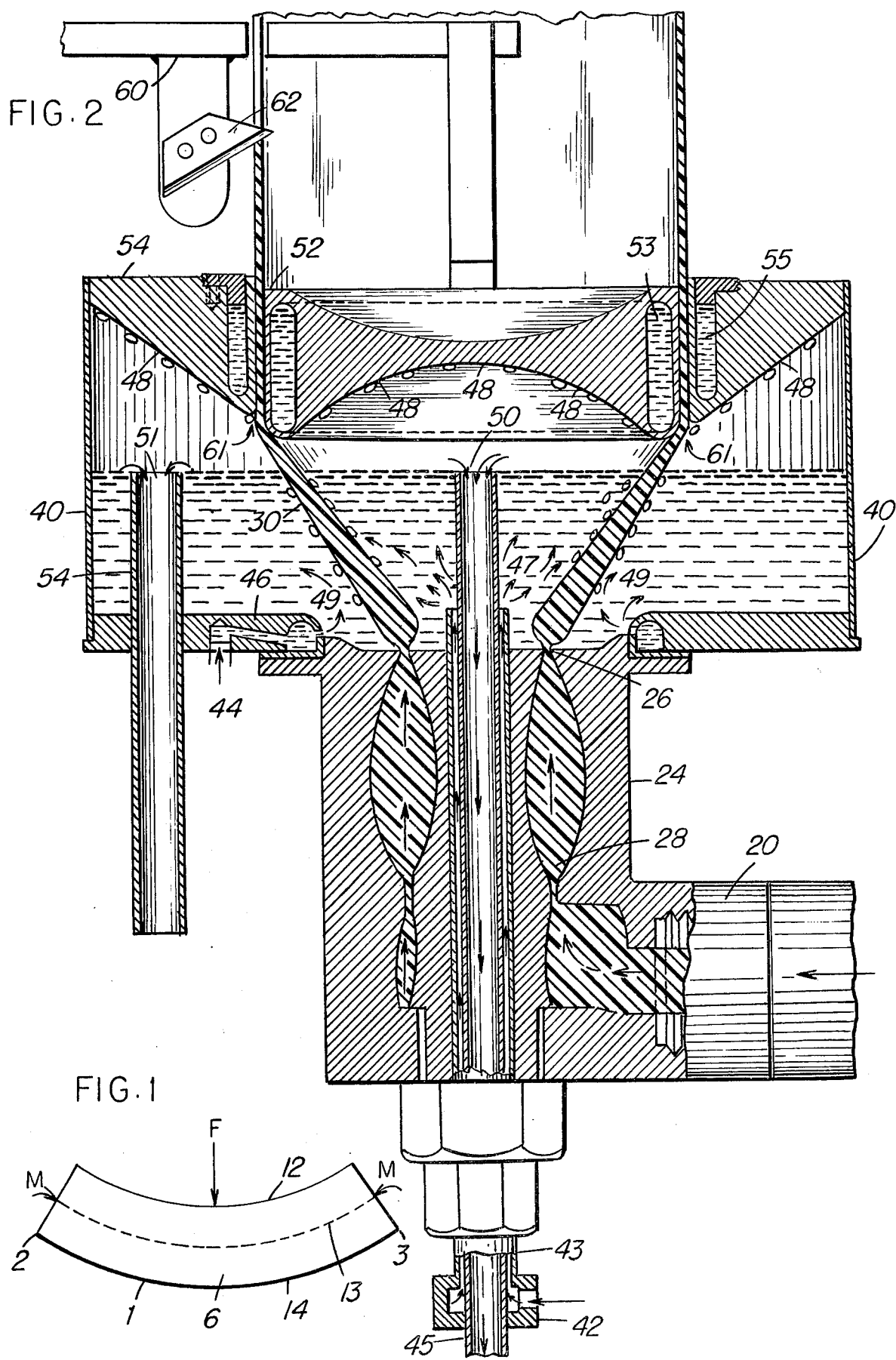

APPARATUS FOR PRODUCING A FOAMED POLYSTYRENE SHEET HAVING A DENSITY GRADIENT DECREASING FROM THE EXTERNAL SURFACES INWARDLY

This application is a division of application Ser. No. 394,039, filed Sept. 4, 1973, now U.S. Pat. No. 3,864,444.

BACKGROUND OF THE INVENTION

1. FIELD OF THE INVENTION

The invention concerns the upward extrusion of polystyrene foam into a cooling media of boiling water. More specifically this invention deals with a means to form a density gradient from high density interior and exterior surfaces of a tubularly shaped extrudate to a low density center core of the extrudate, thereby increasing the strength and rigidity of the polystyrene foam product.

2. DESCRIPTION OF THE PRIOR ART

It has been long recognized that the mechanical properties of certain organic polymers, such as synthetic long chain polymers, can be substantially improved by subjecting such polymeric material to a drawing operation, at suitable temperatures, whereby the molecules of the polymer are oriented in the direction or directions in which the elongation is applied.

It has been previously proposed to produce molecularly oriented sheet material by extruding a hot ribbon of thermoplastic polymer and stretching the extruded ribbon simultaneously or sequentially, in both the longitudinal and the transverse directions. See for example U.S. Pat. Nos. 3,055,048 (Koppehele) and 3,676,539 (Fisher). Conventionally, biaxially orienting plastic film has involved the engagement of the edges of the sheet material by stretching devices which are intended to stretch the sheets in the two directions. However, such devices are somewhat less desirable when utilized to stretch normally brittle thermoplastic material such as polystyrene and polystyrene foam. Polymers of polystyrene are quite brittle at room temperature, and may fracture when subjected to an external force. In stretching polystyrene sheets, the edges of the thermoplastic material are engaged by gripping means which secure the material during the stretching process. The localized stresses created at the point of engagement, particularly where the gripping means are at a temperature lower than that of the thermoplastic material, are often sufficient to produce fractures of the material. Such fractures are particularly prevalent where the thermoplastic material is brittle such as is the case with polystyrene foam.

Work in recent years has accordingly been performed in the development of methods whereby the mechanical properties of thermoplastic materials such as polystyrene foam might be improved through biaxial orientation without the use of such stretching devices. U.S. Pat. No. 2,987,776 (Miller) in an example of such a process. That patent discloses a method whereby a liquid and gas mixture is injected into the hollow interior of a tubular film extrudate as it is being externally cooled. The mechanical properties of such a thermoplastic material may be additionally toughened by processes which further improve upon the strength increase derived from orienting the thermoplastic material molecules.

U.S. Pat. No. 3,299,192 (Lux) states that the rigidity, liquid handling, and thermal insulation capability of foamed plastic pipe was enhanced by quench chilling the internal and exterior walls of the tube within a short time after it emerged from an extrusion die. The patent notes that such chilling produces an impervious and non-porous (so as to promote liquid handling) internal and external skin on the pipe. The patent notes that the inner skin might be made 2 to 5 times as thick as the outer skin for purposes of carrying liquids such as water. The disclosure suggested coolant temperatures of 0 to 80° F and velocities of 50 to 100ft/sec. The examples recite the use of 70° F air as a coolant, blasted from a nozzle upon the extrudate surfaces. Such chilling produced a pipe having a core representing 50 to 94% of the thickness of the pipe, the interior and exterior skins representing the balance of the pipe thickness.

The present invention while related to the Miller and Lux patents distinguishes from them in its ability to very precisely control the cooling conditions of a particular thermoplastic, polystyrene foam, so as to greatly enhance that materials' strength properties. The present invention utilizes the unusual properties of a particular coolant to produce a unique polystyrene foam extrudate having a density gradient of decreasing value from the outside surface to the core.

It is an object of this invention to provide a means for the production of a polystyrene foam extrudate wherein the temperature of the cooling fluid, and thus the cooled extrudate may be very precisely controlled.

A further object of this invention is to provide means capable of precisely controlling a temperature gradient across a thickness of polystyrene foam extrudate.

An object of this invention is to cool from both the interior and exterior surface a polystyrene foam extrudate at a precise temperature selected from the range of about 15° F to 55° F above its glass transition point.

Another object of this invention is to inhibit polystyrene foam cell growth in such a manner as to produce an extrudate whose density and corresponding strength across an extrudate cross section are proportional to the tension and compression stresses which would be produced across such an extrudate cross section when such an extrudate has a moment applied at its end point.

A further object of this invention is to provide means capable of varying the degree of change (or slope) in density across a polystyrene foam extrudate.

Another object of this invention is to provide means to vary the time a polystyrene extrudate is cooled in a coolant bath without varying the rate at which polystyrene is extruded from an extension die.

Other additional objects of this invention will become apparent upon a consideration of this entire specification including the drawing and claims.

BRIEF DESCRIPTION OF DRAWINGS

FIG. 1 is a cross section view of a polystyrene foam extrudate which has been modified in accordance with this invention.

FIG. 2 represents a cross sectional view of an apparatus adopted to perform the method of this invention.

SUMMARY OF THE INVENTION

Figure 3:
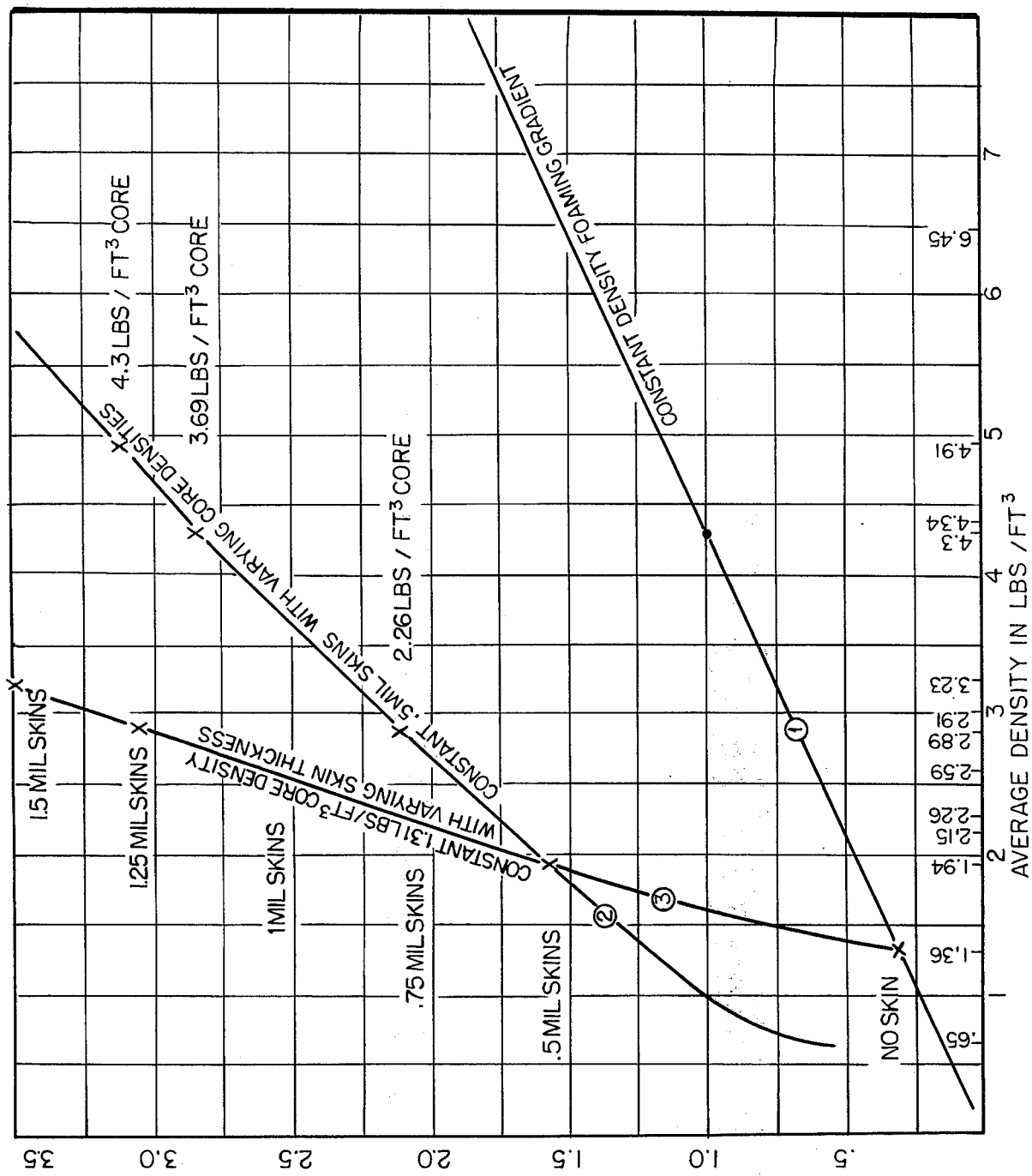
FIG. 3 represents a comparison of the strength of various members as a function of density.

When a product produced from a thermoplastic material which is reasonably long compared with its lateral dimensions so as to resemble a beam is subjected to an external force which produces a moment M, the stress σ produced at any point P in the material may be expressed as follows:

$$\sigma = My/I$$

where I represents the moment of inertia of the material and y is the distance of a point P from the neutral surface of the material. (See, Timoshanko and Young, Strength of Materials 4th ed. (1962) pp. 95–133).

Thus for a material having a given moment of inertia and applied moment, the stresses in the material vary depending upon where point P is located. At the neutral surface, the stresses are zero as y is zero. As y increases, as one moves away from the neutral axis, the stresses increase proportionally. The maximum stresses thus occur at the surfaces of a homogenous material since these surfaces are farthest from the neutral surface.

A consideration of the previously referenced equation leads one to the conclusion that the most economical design would allow for the bulk of the member strength to be located as far away from the neutral axis as possible, so as to be more able to withstand the higher stresses which exist farther away from the neutral surface. Such considerations led to the development of I beams in the structural steel area.

Such a design would aid in preventing a common failure of broken corners experienced in polystyrene foam trays such as meat trays utilized to package and display meats and other products. Such corner breaks typically occur from bending produced due to the weight of the article on the tray when the tray is held by the corner at which failure occurs. The breaks generally occur due to a crack which forms at the surface of the tray, due to the high stress at the surface fibers, the crack then propogating through the tray thereby producing a broken or fractured corner section.

Moreover, the density of the interior portion of such a design, as contrasted with the almost crystalline density of the exterior, produces a resillant and flexible inner section. Such a section partially absorbs the stresses produced by bending, thus further aiding in the prevention of foam tray broken corners.

The present process for producing such an improved product employs a combination of the unique properties of polystyrene and water, and produces a product having greater strength at the polystyrene foam surface where bending stresses are greatest.

According to the present invention, molten polystyrene upon emerging from an extruder die orfice is immediately contacted with boiling water at a temperature selected from the range of about 170° F – 230° F. Such temperatures may be achieved by varying the pressure of the boiling water reservoir from which the boiling water is circulated to the polystyrene cooling chamber and then returned to the reservoir. Such pressure might be controlled for example by varying the hydraulic head within the reservoir. The reservoir could also be placed under a vacuum for lower boiling temperature. Perhaps due to the fact that such temperatures are slightly above the glass transition point or softening point of polystyrene (about 175° F), boiling water has not previously been considered as a cooling media for polystyrene foam extrudate. However, it has been discovered that the use of boiling water to cool the extrudate produces unusually superior results. The unique characteristics of water at its boiling point allow for very precise control of the strength properties of polystyrene product produced. The extremely high heat of vaporization of water (about 977 B.T.U./lb at 212° F) allows for very exact temperature control at the water boiling point. Water will absorb great quantities of heat before forming steam at a temperature above the water boiling temperature. It has been calculated that the heat absorption of one pint of boiling water (without changing temperature) is equivalent to the heat absorption capabilities of about 13,000 cubic feet of air with a 4.5° F temperature change. The heat absorptive capabilities of water thus allow for greatly reduced coolant velocities. In a preferred embodiment the boiling water coolant is circulated at a rate of about 0.25 lbs/min. to about 5 lbs/min.

The relatively high temperature of the boiling water coolant allows for more precise control of the polystyrene extrudate temperature because the small temperature differential between the coolant and the polystyrene (typically extruded at about 270° F to 320° F) allows the cooling to take place slowly and gradually at the core. Moreover, this invention's apparatus for carrying out the process allows for varying of the time the extrudate is exposed to the boiling water through varying the height of the water bath through which the extrudate is passed.

In addition to the high heat of vaporization characteristic of water at 212° F, the design of the invention's apparatus for cooling the polystyrene extrudate allows for utilization of the steam condensate produced by the process as a lubricant for the polystyrene being formed.

The polystyrene article produced when cooled in accordance to the method of the invention has a density gradient from the center core of the article to the surface of the article. The density of the surfaces has a density range of about 65 to about 55 lb/ft$^3$, while the center core has a density of about 1.3 to about 3 lb/ft$^3$. The core represents at least 95% of the thickness of the article, and it represents about 97% in a preferred embodiment.

Various polymers can be used to form the foamed plastic sheeting.

Although elongation to a substantial extent negates the need for a rubber additive, it is anticipated that such an additive might be utilized in connection with this process. When employing polystyrene there can be employed normal crystal grade polystyrene or high impact polystyrene or a mixture containing 5 to 95% normal crystal grade polystyrene and the balance high impact polystyrene. High impact polystyrenes are frequently prepared by polymerizing monomeric styrene in the presence of 2½ to 10% weight of a rubbery diene polymer or by polymerizing styrene in the presence of such amounts of a difunctional material. (Unless otherwise indicated, all parts and percentages are by weight).

To insure the formation of a foamed plastic core, a nucleating agent should be used in forming the foamed sheet. When a nucleating agent is employed, it is used in an amount of from 0.02 to 10% of the total polystyrene by weight. Preferably, 0.2 to 2% of the nucleating agent is used.

Conventionally, the nucleating agents are made up of two materials which react to form carbon dioxide and water. The two materials are normally used in approximately equivalent amounts. As the carbon dioxide liberating materials there can used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarobonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid and phthalic acid. In place of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts, e.g., Triton X-100 (t-octylphenolethylene oxide adduct having 10 ethylene oxide units in the molecule, sodium lauryl sulfate and sodium dodecylbenzene sulfonate. The wetting agent can be non-ionic or anionic.

One mode of incorporating the forming agent into the polymer is by premixing the pelletized solid thermoplastic polymer, e.g., a styrene polymer, with a minor amount of an absorbent having absorbed thereon a volatile liquid (i.e., the foaming agent) which is non-reactive with and which has not more than a slight solvent action on the polymer. The liquid should volatilize below the softening point of the polymer.

The preferred mode entails a dual extrusion process. A pre-blended mixture of nucleating agent and polystyrene pellets are fed into a first or primary extruder. A blowing agent is separately injected into the primary extruder, preferably at about the midpoint of the primary extruder barrel. This homogenous mixture of polystyrene, nucleating and blowing agent is then passed through a second extruder which is utilized to control the temperature at which the mixture exits the extrusion section.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1 – 15%, preferably 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, cyclohexane, cyclopentane, pentadiene and neopentane. Other volatile liquids include methanol, ethanol, methyl acetate, ethyl acetate, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% of more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is non-reactive with the particular polymer employed. Usually, the amount of volatile liquid will be 0.1 to 15% by weight of the polystyrene to be expanded. The amount of volatile liquid will depend upon the extent of the foaming desired. In general, the greater the amount of absorbed volatile liquid in the polymerabsorbent mixture the more the expansion. It has been found that good expansion can be obtained using very small amount of the volatile liquid.

The volatile liquid is held in solution with the molten polystyrene by the pressure which is used to force the mixture of polystyrene, nucleating agent and volatile liquid (sometimes referred to as a blowing agent) through the extrusion die. Upon leaving the extrusion die orfice, the volatile liquid begins to expand (due to the decreased pressure and the high molten polystyrene temperature) and form a cell structure referred to as foam. The cooling provided by the boiling water inhibits cell growth as the lower temperature produced by boiling water inhibits the volatile liquid expansion. It has been found that the amount of the cells making up the foam structure form a gradient similar to the temperature gradient across a cross-section of polystyrene. The relatively hot core produces most of the cells, and the number of the cells decreases (proportional to the temperature decrease) from this center core outward toward the interior and exterior surfaces of the cylindrical extrudate. As the number of the cells decreases, the density and strength of the polystyrene foam extrudate increases. Production of such a density gradient allows for the production of polystyrene products whose average density is less for a given strength than polystyrene products without such a density gradient.

Polystyrene products having a uniform cross-section (no density gradient) must have a density at the outer surface, where the greatest compressive and tensional forces due to bending occur, sufficient to withstand such compressive and tensional forces. Thus the density of the entire cross-section of the product would be determined by the density and strength requirements of the interior and exterior surface fibers.

Application of the present invention allows for very exact tailoring of the polystyrene density and corresponding strength. FIG. 3 illustrates the dramatic average foam density decreases which may be achieved by applicants's method with not only no resulting loss in strength, but in fact a strength increase. The three curves of FIG. 3 all show the strength of polystyrene members such as trays utilized to display and support products such as meat in supermarkets and other retail outlets. The strength is plotted against the average density of the polystyrene product in the curves of FIG. 3. Curve 1 shows the strength characteristics of a constant density foam (no density gradient through the polystyrene thickness). Curve 2 illustrates a polystyrene foam product of varying densities (as shown) having a constant 0.5 mil oriented skin on both sides of its core. Curve 3 shows the beam strength properties of a polystyrene foam product having a constant core density and varying skin thickness (as shown). While curves 2 and 3 do not represent true gradients they do approximate such gradients and illustrate the dramatic strength increases which may be produced by more closely matching density to stresses produced by bending. Examination of the curves shows that a foam gradient product having an average density of 2.6 lb/ft.$^3$ produces a beam strength 2.6 times as great as that of a product having a constant density of 4.3 lb/ft.3

The economic importance of such an invention is clear. Polystyrene products may be produced which require less than half the amount of polystyrene presently used, yet which have greater strength properties. Production line speeds might be increased 100% without changing the amount of molten polystyrene flow through the extruder.

DESCRIPTION OF SPECIFIC EMBODIMENTS

Referring to FIG. 1, an article, such as a tray produced from polystyrene foam, 1 is supported or held at each end 3 and 2, the weight of a product or substance on the tray 1 produced a force F, which tends to deflect or bow a middle portion 6 of the tray 1 downward. The force F also produces a movement M at the and 2 of tray 1. The defection is exaggerated in FIG. 1 for purposes of illustration. A top portion 12 of the tray 1 is placed in compression due to the downward deflection of the middle portion 6 produced by force F while the bottom portion 14 is placed in tension.

The top portion 12 of the tray 1 tends to shorten due to the compression forces, while the bottom portion 14 tends to elongate due to the tension forces. Somewhere in between the top portion 12 and the bottom portion 14, there is a surface shown as a surface 13 in FIG. 1, which remains unchanged in length and is termed a neutral surface.

Referring to the equation noted, the stresses vary linearly with the distance from the neutral surface 13. Thus the greatest stresses of the material fibers occur at the top surface 12 and the bottom surface 14 as these surfaces are the farthest removed from the neutral surface 13. For materials which are homogenous and obey Hooke's law, the modulus of elasticity in tension is the same as that in compression, and the streses at the top surface 12 and the bottom surface 14 of the polystyrene article will be equal.

Referring now to FIG. 2, an apparatus and process are described which may be used to produce an economically designed material made of polystyrene.

Molten polystyrene at a temperature of at least about 280° F is forced due to pressure into a die 24 by way of an inlet 20. The molten polystyrene is forced upwardly through an annular passage 28 of the die 24 and emerges as a tubular shaped extrudate 30 from an annular orfice 26. Immediately upon exiting from the annular orfice 26, the molten polystyrene is contacted with water boiling at 212° F in a chamber 40. The tubularly shaped extrudate 30 is drawn between an annular calender ring inner member 52 and an outer member 54. The inner member 52 and outer member 54 may be chilled with cold water (below 100° F) which is circulated through a cavity 53 in the inner member 52 and a cavity 55 in the outer member 54. A knife 62 is mounted on a support 60 in the path of the tubularly shaped polystyrene extrudate 30 so as to cut through the extrudate 30 as the extrudate 30 is drawn across the knife 62.

Of particular novelty is that portion of the extrusion apparatus wherein the polystyrene extrudate 30 passes through a bath of boiling water contained in the chamber 40. This portion of the apparatus will now be discussed in detail.

Boiling water is supplied at a center inlet 42. Water entering inlet 42 is forced upward in the annular opening between a hollow duct 45 and an enclosing hollow duct 43. This boiling water may be discharged at a point 47 into chamber 40 wherein the interior surface of the polystyrene extrudate 30 is contacted with the water. Water upon reaching the top 50 of the vertically adjustable duct 45 passes down the hollow inner portion of the duct 45 and may then be recooled (reheated during startup) and reintroduced at an inlet 42 or inlet 44.

The outer surface of the extrudate 30 is cooled in a similar manner. Boiling water may be forced into the outer inlet 44 and passes through a housing 46 and into the chamber 40 through an annular opening 49. Upon reaching the level of the top of a vertically adjustable hollow duct 54, the water passes down the hollow inner portion of the duct 54 and may then be recooled (reheated during startup) and reintroduced at outer inlet 44 or inner inlet 42. In a preferred embodiment the coolant temperature and bath height are the same at the interior and exterior surfaces of the extrudate being cooled. However, such temperatures might be held at different points and the bath height varied in order to achieve a particular product strength.

Water droplets condense on an upper wall 48 of the chamber 40 as the upper wall 48 is adjacent the cold water circulated in the cavities 53 and 55. The wall 48 is sloped so as to allow such condensate to travel downward along the surface of the wall 48 to an inlet 61 to the calender ring members 52 and 54. Such water condensate acts as a lubricant and facilitates the passage of the extrudate 30 between the inner calender ring member 52 and the outer calender ring member 54.

What is claimed is:

1. In combination with an apparatus comprising a die having an inlet and an outlet, said outlet being annular and being further characterized as positioned at the top of said die thereby allowing a hot cylindrical thermoplastic to be extruded upwardly through said die outlet; and an annular calender ring located above said die, said calender ring having the same centerline as said annular die outlet, said calender ring having an inside diameter larger than the outlet outside diameter of said die, thereby allowing an extrudate from said die to be biaxially stretched as said extrudate is drawn from said die and through said calender ring, the improvement which comprises: A chamber located between and immediately adjacent to said die and said calender ring; a stationary first hollow duct extended upward through said die and inside said inner diameter of said annular die outlet into said chamber; a vertically moveable second hollow duct positioned within said first duct and thereby creating an annular space between said first duct and said second duct; a vertically moveable third hollow duct extended upward into said chamber and being located outside the outer diameter of said annular die outlet; a cooling fluid discharge located at the base of said chamber and outside said outer diameter of said die outlet; pumping means to circulate said coolant through said chamber; a coolant temperature control means associably connected with the pumping means; discharge piping connecting said pumping means to said cooling fluid discharge and said annular space between said first and second ducts; a reservoir containing a quantity of said coolant; piping connecting said reservoir to said second and third moveable ducts; and suction piping connecting said reservoir to said pumping means.

2. An apparatus as claimed in claim 1 wherein said improvement further comprises means to cool said calender ring where said cooling means is located in the inner and outer periphery of said calender ring.

* * * * *